N. SPOFFORD.

Assignor to W. A. IVES & COMPANY.

Brace for Bits.

No. 8,215. Reissued May 7, 1878.

Witnesses.

J. H. Chumney

C. B. Wilson

Nelson Spofford
Inventor.

By atty.

Wm. E. Earle

N. PETERS, PHOTO-LITHOGRAPHER, WASHINGTON, D. C.

UNITED STATES PATENT OFFICE.

NELSON SPOFFORD, OF HAVERHILL, MASSACHUSETTS, ASSIGNOR TO W. A. IVES & CO., OF NEW HAVEN, CONNECTICUT.

IMPROVEMENT IN BRACES FOR BITS.

Specification forming part of Letters Patent No. 25,984, dated November 1, 1859; Reissue No. 2,576, dated April 23, 1867; extended November 1, 1873, for seven years; Reissue No. 8,215, dated May 7, 1878; application filed May 1, 1878.

*To all whom it may concern:*

Be it known that I, NELSON SPOFFORD, of Haverhill, in the county of Essex and State of Massachusetts, have invented a new Improvement in Braces for Bits; and I do hereby declare the following, when taken in connection with the accompanying drawings and the letters of reference marked thereon, to be a full, clear, and exact description of the same, and which said drawings constitute part of this specification, and represent, in—

Figure 1:
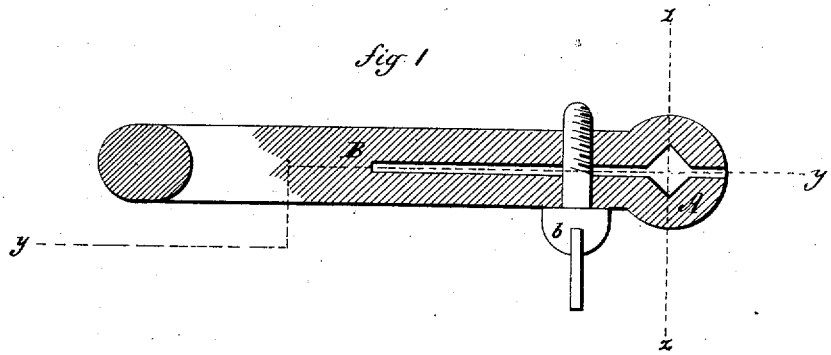
Figure 2:
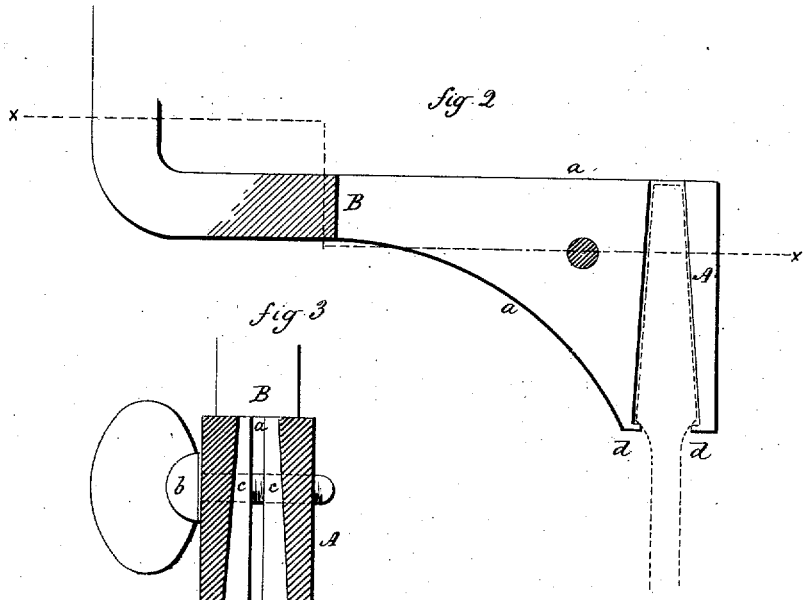
Figure 3:
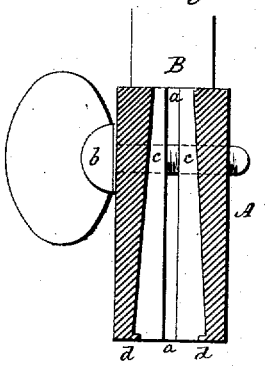

Figure 1, horizontal section on line *x x;* Fig. 2, vertical section on line *y y;* Fig. 3, transverse section on line *z z.*

This invention relates to an improvement in the instrument or tool known as "bit-brace;" and which consists of a device to engage the taper shank of the bit, a head to serve as a means for holding the instrument, and a crank between the head and the said bit-holding device, whereby the bit may be turned.

In the construction as generally formed prior to my invention the holding device consisted simply of a socket, unyielding and unvariable in size, and provided with a thumb screw or latch, which engaged in a notch in the shank of a bit when properly introduced into the said socket. This construction necessitated the fitting of each bit to the socket, it being incapable of holding bits of different size or taper of shanks.

The object of this invention is to construct the holding device so that it will accommodate itself to different sizes and tapers of the shanks of bits, as well as to provide a means for securely holding the bit; and it consists in the construction, as hereinafter described, and more particularly recited in the claims.

A represents the lower arm of the brace. This arm carries a pair of jaws, *a a,* (here represented as a part of the arm,) the said arm divided or split vertically, each of the parts of the arm produced by the said split carrying one of the said jaws. Each of the said jaws is constructed with a V-shaped groove in its face adjacent to the other jaw, tapered from near its lower end or mouth upward, so that the cavity produced by the combined grooves is of rectangular shape in transverse section, and so as to receive the tapered shank of the bit.

The two jaws are clamped together by means of a screw, B, passing through and bearing upon one part and screwing into the other. The two jaws being substantially free from each other their entire length, they accommodate themselves to the different tapers of shank which may be introduced between them. The forcing of the jaws together upon the shank causes them to thus adapt themseves to the taper of that shank. At the mouth or larger end of the opening between the jaws internal projections *d* are formed, extending inward, so as to grasp over the shank, as seen in Fig. 2, and thus prevent the bit from being withdrawn from the grasp of the jaws.

The shank of the bit is passed between the jaws until its tapered shank is above the projections *d;* then the two jaws are forced together.

No notch or spring is required, as in the previous construction, and it is not necessary to bestow special care in making the shanks of the bit exactly of the same size and taper, as required in the common brace, in which each shank must fit exactly into the socket of the brace in order to be firmly held. The usual notch in the shank to accommodate the latch which retains it is avoided, because with this brace the projections *d* serve for all sizes of bits adapted to the capacity of the stock, so that the labor which has to be performed on the bits in order to make them fit the common brace is considerably reduced, if not entirely avoided.

I claim—

1. In a bit-brace, the combination, substantially as described, of a pair of jaws constructed to move from or toward each other, so that they may conform to the taper of the bit-shank, with a device to force said jaws upon the bit-shank.

2. In a bit-brace, a pair of jaws constructed with grooves fitted to embrace the taper sides of a bit-shank, and with internal projections *d d* at the mouth of the cavity formed by said grooves for closing over the shoulders of the bit-shank, in combination with a device for forcing such jaws against the bit-shank, substantially as specified.

3. In a bit-brace, a pair of jaws, each constructed with a groove to embrace the taper sides of a bit-shank, and with internal projections at the mouth of the cavity formed by said grooves, substantially as and for the purpose specified.

4. A bit-stock constructed with the lower arm slitted along its center in a vertical plane, each of the parts made by the said division carrying one of the pair of jaws, which together form an expanding socket, substantially as described.

5. A bit-stock constructed with the lower arm slitted along its center in a vertical plane, each of the parts made by the said division carrying one of the pair of jaws, which together form an expanding socket, and combined with means for clamping the said jaws upon the shank of the bit, substantially as described.

N. SPOFFORD.

Witnesses:

JOHN S. SPOFFORD,

F. O. NICHOLS.